Figure 1:
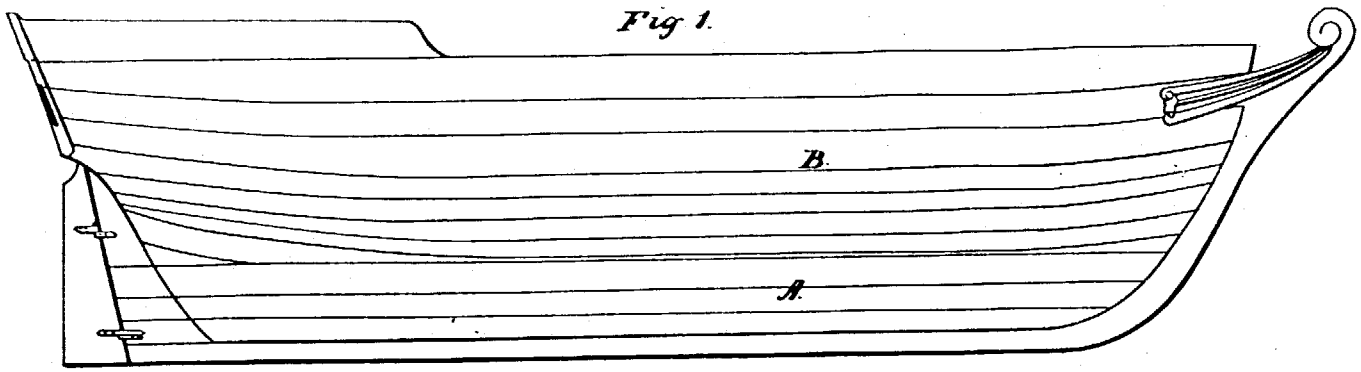
Figure 2:
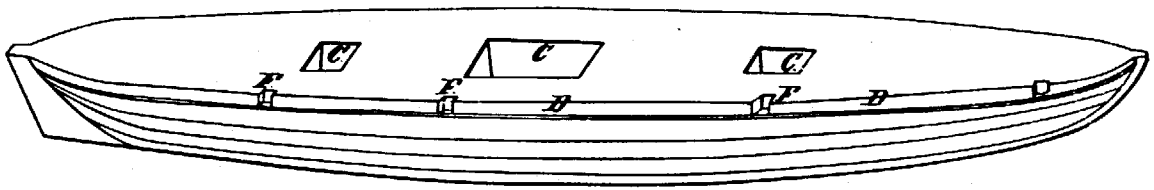
Figure 3:
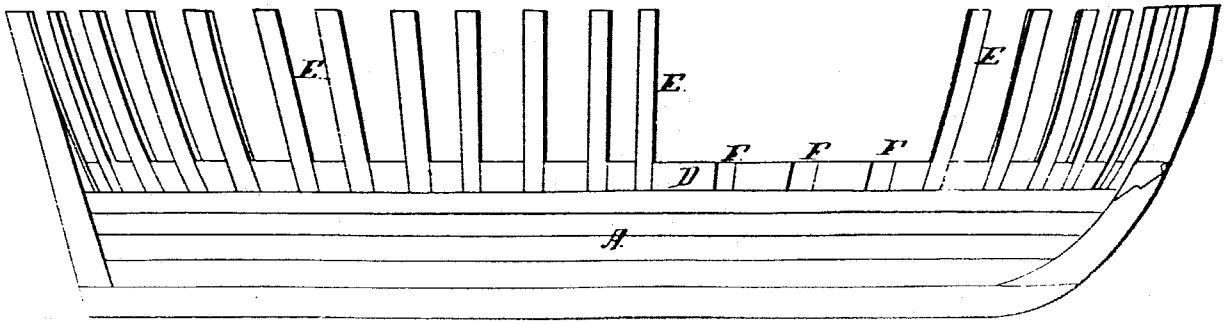

7509X

J. Barron.

Ship Building.

Patented Apr. 5, 1833.

N. PETERS, PHOTO-LITHOGRAPHER, WASHINGTON, D.C.

7509X

UNITED STATES PATENT OFFICE.

JAMES BARRON, OF THE UNITED STATES NAVY.

IMPROVEMENT IN THE CONSTRUCTION OF VESSELS.

Specification forming part of Letters Patent dated April 5, 1833.

*To all whom it may concern:*

Be it known that I, JAMES BARRON, of the United States Navy, now residing in the city of Philadelphia, Pennsylvania, have made an Improvement in the Construction of Vessels, whereby they can be rendered stronger, cheaper, more durable, and safer, &c., in the following manner.

These vessels are to be composed of solid logs of the lightest timber, such as white pine, hemlock, poplar, &c., their size to be regulated, as convenience may require, from twelve to twenty-four inches square, and of such length as may also be convenient. They are then to be arranged in the following order: The first log laid down may serve for the keel, when one is required. On the top of that place one tier of the logs crosswise, on the upper surface of which lay tier lengthwise over those which have already been laid crosswise, and so proceed with alternate tiers until a quantity sufficient to produce a bulk that will float one foot or more above the surface of the water be laid, when the upper works and all the other materials that may be required are added. To secure this mass together, wood bolts or treenails three or four inches in diameter should be used, and of sufficient length to pass through one and a half of the logs, to which this one is thus to be secured if they are in the situation to receive the bolts. By this up-and-down, crosswise, and lengthwise bolting the whole mass will be rendered perfectly secure with but a small portion of metal. This done and the model desired formed, a rabbet of two or more inches should be cut into the side of the solid work downward as much as two or more feet. The timbers then intended to form the upper works should be let their thickness into the sides of the solid vessel from which this rabbet has been cut off, so as to leave the thickness below which you intend your plank for the upper works shall be, thus forming a projection to meet the lower edge of the lowest plank, which must make a fair surface with the sides of the solid work and cover the ends of the timbers.

The advantages of a vessel thus constructed are peculiarly adapted to the purposes of war, inasmuch as they cannot be sunk by gunshot or other common casualties which occasion sudden leaks, for as there is no cavity in them sufficient to hold a quantity of water adequate to overcome their buoyancy the danger of sinking is avoided. Yet it has been satisfactorily proved by experiment and is equally deducible from calculation that there may be left in the solid part of these vessels suitable accommodation for all their stores, such as ballast, ammunition of all sorts, shot, shells, powder, water and provisions, bread, &c. Lighter articles may be carried on the surface of the solid part of the vessel, which will correspond with the common appellation of "berth-deck."

I shall contend for my right to this invention in whatever description of vessels it may be used, for although it may not have temptations for merchants, the cavity or accommodation for goods being reduced by the introduction of so large a portion of material, yet for some particular purposes—such as steam-vessels on the western waters, packets on the ocean, bomb-ketches, steam-batteries, and gunboats—it will possess many advantages. The woods of which they are recommended to be built not possessing more than four-tenths of the gravity of water admits of their having pits sunk so low down into the solid log-work as to allow the ballast in sufficient quantity to be placed as near the bottom as may be necessary for all the purposes of stability, and also other pits or excavations for the accommodation of the greatest part of the stores which can be rendered perfectly secure by introducing tanks into these excavated spaces or by calking the seams in them. Should this method be employed in the construction of steamboats, they might be rendered perfectly safe, except to those who might be employed about the engine, as the whole of their machinery could be placed in a pit in the solid log-work, capable of resisting any explosion which could result from an accident to the vessel or machinery. These vessels should be calked outside and coated with turpentine and tallow, and it would be advisable to sheath them for fresh-water-river service and to copper them for sea voyages.

On the upper surface of the solid log-work, about twelve inches from the inside of the ceiling of the upper works, cut a groove or gutter from stem to stern along the side, of about six inches wide and four or five deep, to catch the water that may leak into the upper frame-work. Opposite the pumps cut a cross-groove on each side of those for shafts to lead the water to a reservoir cut down into the log-work under the pumps to collect the water, and from whence these pumps would take it, and thus free the vessel from the only inconvenience or danger that could arise from leakage, which, however, could only damage the stores and inconvenience the crew. It should also be known that these vessels are free from the danger occasioned by ice, as they cannot be cut through.

To ascertain the floatage of a vessel built on this plan, use the following simple calculation, thus explained: The specific gravity of the woods recommended to be employed in the construction of these vessels is as four to ten compared with water. Consequently any oblong block of these light woods will float six parts above the water and four under its surface, and from this principle it will vary according to the shape given to the bottom of the vessels, which, if constructed wide and flat, will amount to about one-fourth of the part under water, to be added to its first immersion, and if narrower and sharper one-third must be added, as thus, for example: Suppose a block of white pine eighteen inches long, six inches wide, and two inches thick. It will be found to float six-tenths of its bulk above the water and four-tenths under it, and if modeled, as stated in the first position, wide and flat the vessel will float one-fourth deeper in the water and draw one-tenth of its thickness more than the square block, say five-tenths; but if modeled, as in the second position, narrower and sharper one-third added to the first draft will show the water-line five and one-third tenths, leaving a bulk above the water of four and two-third tenths of its thickness, which will be found sufficient to float all the upper works and materials required for any vessels built on this plan, which will be remarkably appropriate for floating lights as well as for other vessels already named. Vessels built on this plan will also be free from the danger of fire.

In order to preserve the timber and the buoyancy of the vessel, I would recommend that each log of the square timber be coated with turpentine and tallow as it is laid in its place.

The invention here claimed and desired to be secured by Letters Patent consists in the arrangement and construction of the several parts of the vessel with solid logs pinned or bolted together, as before described, so as to make it incapable of immersion and sufficiently strong to resist shocks, whether applied as a vessel of war, a merchant-vessel, a steam-vessel, or a life-boat; but I do not claim the shape of the vessel, nor any of the parts, nor their arrangements now in use.

I also claim constructing the sides of vessels with logs in cases where it may be desired.

JAMES BARRON.

Witnesses:
WM. ELLIOT,
SAML. P. WALKER.